(12) United States Patent
Kajiyama et al.

(10) Patent No.: US 11,520,120 B2
(45) Date of Patent: Dec. 6, 2022

(54) OPTICAL SYSTEM, AND IMAGING APPARATUS AND ACCESSORY APPARATUS INCLUDING THE SAME

(71) Applicant: CANON KABUSHIKI KAISHA, Tokyo (JP)

(72) Inventors: Kazuhiko Kajiyama, Utsunomiya (JP); Tsubasa Nakamura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 457 days.

(21) Appl. No.: 16/595,315

(22) Filed: Oct. 7, 2019

(65) Prior Publication Data

US 2020/0116977 A1    Apr. 16, 2020

(30) Foreign Application Priority Data

Oct. 16, 2018    (JP) .............................. JP2018-195423

(51) Int. Cl.
| | |
|---|---|
| *G02B 9/04* | (2006.01) |
| *G02B 5/20* | (2006.01) |
| *G02B 7/02* | (2021.01) |
| *G03B 17/14* | (2021.01) |
| *H04N 5/225* | (2006.01) |
| *H04N 5/232* | (2006.01) |

(52) U.S. Cl.
CPC ................ *G02B 9/04* (2013.01); *G02B 5/20* (2013.01); *G02B 7/021* (2013.01); *G03B 17/14* (2013.01); *H04N 5/2254* (2013.01); *H04N 5/2258* (2013.01); *H04N 5/23229* (2013.01)

(58) Field of Classification Search
CPC .......... G02B 13/02; G02B 15/02; G02B 5/20; G02B 7/021; G02B 9/04; G03B 17/14; H04N 5/2254; H04N 5/2258; H04N 5/23229
See application file for complete search history.

(56) References Cited

U.S. PATENT DOCUMENTS

| | | | | |
|---|---|---|---|---|
| 4,324,458 A | * | 4/1982 | Sato ....................... | G02B 13/02 359/764 |
| 4,368,956 A | * | 1/1983 | Yamada .................. | G02B 9/36 359/773 |
| 6,016,224 A | | 1/2000 | Namiki | |

(Continued)

FOREIGN PATENT DOCUMENTS

| | | |
|---|---|---|
| JP | 11-287959 A | 10/1999 |
| JP | 2011-33741 A | 2/2011 |

(Continued)

*Primary Examiner* — Joseph P Martinez
*Assistant Examiner* — Vipin Patel
(74) *Attorney, Agent, or Firm* — Canon U.S.A., Inc. IP Division (57) ABSTRACT

An optical system for converting light from an object into parallel light, and guiding the parallel light to a plurality of image forming units each configured to form an image of the object includes a first lens unit having positive or negative refractive power and a second lens unit having positive refractive power that are disposed in order from an object side, wherein the first lens unit and the second lens unit are disposed at a widest interval in the optical system, and wherein the first lens unit consists of at least one positive lens and at least one negative lens that are disposed in order from the object side.

18 Claims, 6 Drawing Sheets

(56) References Cited

U.S. PATENT DOCUMENTS

| | | | |
|---|---|---|---|
| 2003/0007254 A1 | 1/2003 | Tocci | |
| 2006/0017834 A1* | 1/2006 | Konno | H04N 5/2254 |
| | | | 348/335 |
| 2010/0231784 A1* | 9/2010 | Matsuda | H02J 7/02 |
| | | | 348/E5.022 |
| 2015/0234150 A1 | 8/2015 | Katsunuma | |
| 2018/0210173 A1 | 7/2018 | Blahnik | |

FOREIGN PATENT DOCUMENTS

| | | |
|---|---|---|
| JP | 2013-29322 A | 2/2013 |
| JP | 2013-88456 A | 5/2013 |
| JP | 2013-130549 A | 7/2013 |
| WO | 2013/179620 A1 | 12/2013 |
| WO | 2017/221333 A1 | 12/2017 |

* cited by examiner

OPTICAL SYSTEM, AND IMAGING APPARATUS AND ACCESSORY APPARATUS INCLUDING THE SAME

BACKGROUND OF THE INVENTION

Field of the Invention

The aspect of the embodiments relates to an optical system that converts light from an object into parallel light, and is suitable for an imaging apparatus such as a digital still camera or a video camera, for example.

Description of the Related Art

As an optical system used in an imaging apparatus, there has been known an optical system that forms a plurality of images of the same object (subject) using a plurality of lenses. In such an optical system, by providing a plurality of filters having mutually different transmission characteristics on an optical axis of the plurality of lenses, a plurality of pieces of image information mutually different from each other can be simultaneously acquired in one image capturing.

United States Patent Application Publication No. 2015/0234150 discusses an imaging apparatus that reduces or prevents occurrence of parallax among a plurality of images of an object, by converting light from the object into parallel light using a collimator optical system that is disposed closer to an object than a plurality of lenses and a plurality of filters.

In the imaging apparatus discussed in United States Patent Application Publication No. 2015/0234150, refractive power and arrangement of the plurality of lenses constituting the collimator optical system are not appropriately set, and therefore it is difficult to realize satisfactory optical performance while downsizing the entire system of the collimator optical system.

SUMMARY OF THE INVENTION

According to an aspect of the embodiments, an optical system for converting light from an object into parallel light, and guiding the parallel light to a plurality of image forming units each configured to form an image of the object includes a first lens unit having positive or negative refractive power and a second lens unit having positive refractive power that are disposed in order from an object side, wherein the first lens unit and the second lens unit are disposed at a widest interval in the optical system, and wherein the first lens unit consists of at least one positive lens and at least one negative lens that are disposed in order from the object side.

Further features of the disclosure will become apparent from the following description of exemplary embodiments with reference to the attached drawings.

DESCRIPTION OF THE EMBODIMENTS

Hereinafter, exemplary embodiments of the disclosure will be described with reference to the drawings. In addition, the drawings are sometimes drawn in a scale size different from an actual scale size for the sake of convenience. In addition, in the drawings, the same members are assigned the same reference numerals, and the redundant descriptions will be omitted.

Figure 1:
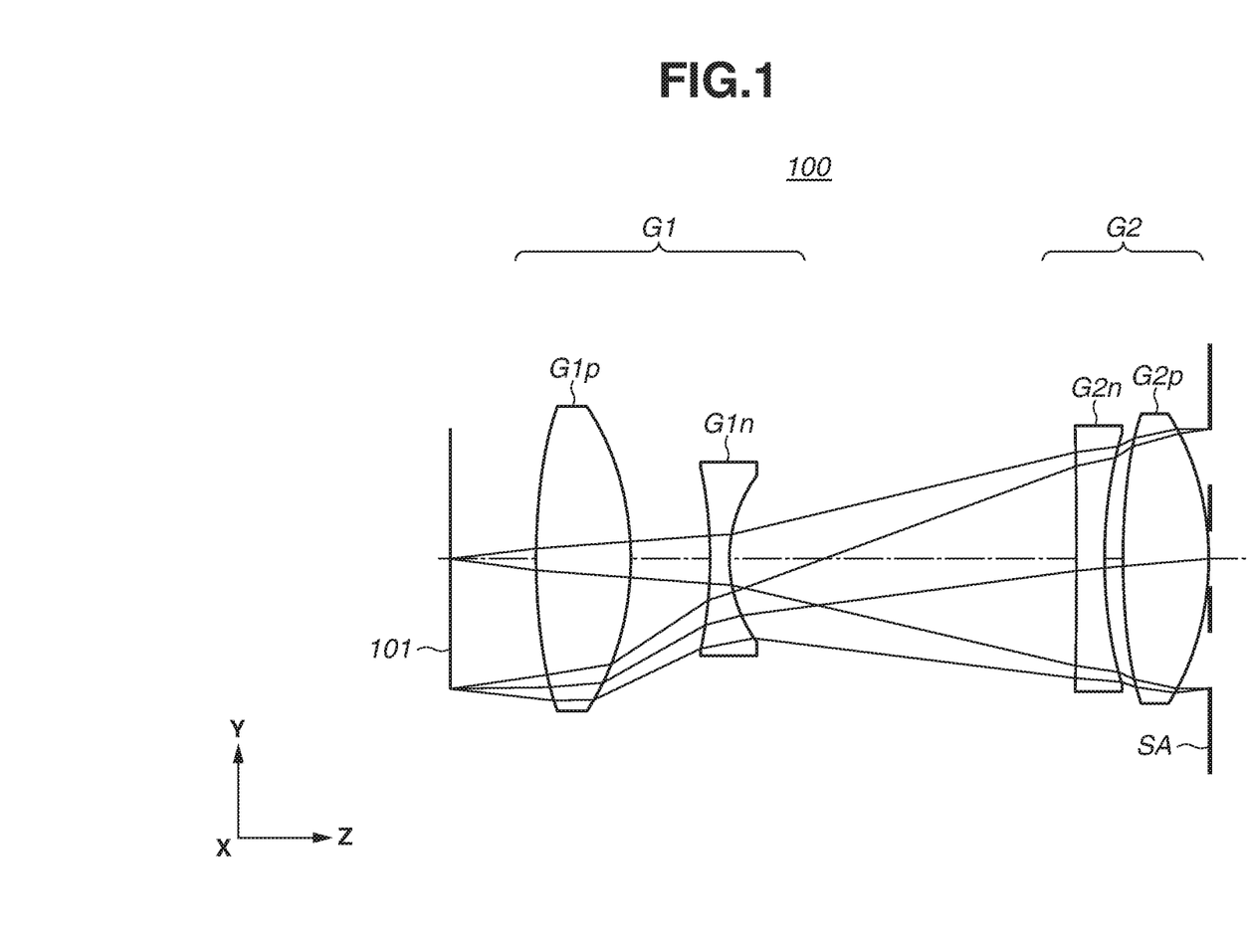
FIG. 1 is a main part schematic diagram illustrating an optical system according to an exemplary embodiment.

FIG. 1 is a main part schematic diagram illustrating an optical system 100 according to an exemplary embodiment of the disclosure in a cross-section including an optical axis (YZ cross-section). The optical system 100 according to the present exemplary embodiment is an optical system (collimator optical system) that converts light from an object surface 101 into parallel light. The parallel light in this specification is not limited to parallel light, and includes substantially-parallel light (weak diverging light or weak converging light). In addition, FIG. 1 illustrates a state in which light from the object surface 101 disposed at a position relatively close to the optical system 100 is guided to a stop array SA to be described below.

The optical system 100 according to the present exemplary embodiment includes a first lens unit G1 having positive or negative refractive power and a second lens unit G2 having positive refractive power that are disposed in order from an object side (−Z side) to an image side (+Z side). In addition, the first lens unit G1 and the second lens unit G2 are disposed at a widest interval in the optical system 100. In addition, the first lens unit G1 includes at least one positive lens and at least one negative lens that are disposed in order from the object side. Hereinafter, the at least one positive lens in the first lens unit G1 will be collectively referred to as a positive lens unit G1p, and the at least one negative lens therein will be collectively referred to as a negative lens unit G1n.

In this manner, by disposing the positive lens unit G1p at a position closest to the object in the optical system 100, and disposing the negative lens unit G1n at the position adjacent to the image side (+Z side) of the positive lens unit G1p, an absolute value of refractive power of each lens unit is increased. With this configuration, a principal point of the optical system 100 can be positioned closer to an image while the length of the first lens unit G1 is sufficiently shortened. Accordingly, a satisfactory telecentric property on the object side can be realized while the entire system of the optical system 100 is downsized.

In addition, in one embodiment, the second lens unit G2 includes a negative lens unit (at least one negative lens) and a positive lens unit (at least one positive lens) that are disposed in order from the object. With this configuration, diverging light from the first lens unit G1 can be diverged using the negative lens unit, and a degree of the divergence can be reduced using the positive lens unit immediately after that. Accordingly, the diverging light from the first lens unit G1 can be converted into parallel light while the length of the second lens unit G2 is sufficiently shortened. The second lens unit G2 according to the present exemplary embodiment includes a negative lens unit G2n and a positive lens unit G2p that are disposed in order from the object side to the image side.

In addition, with a configuration in which the first lens unit G1 and the second lens unit G2 each include a pair of a positive lens unit and a negative lens unit as in the optical system 100 according to the present exemplary embodiment, chromatic aberration can be satisfactorily corrected in each lens unit. For further downsizing the optical system 100, the first lens unit G1 includes one positive lens and one negative lens. Similarly, the second lens unit G2 includes one positive lens and one negative lens.

In the first lens unit G1, in one embodiment, the following Conditional Expression (1) is satisfied:

$$-4.0 < F1p/F1n < -0.2 \qquad (1),$$

where a focal length of the positive lens unit G1p (combined focal length of the at least one positive lens) is denoted by F1p, and a focal length of the negative lens unit G1n (combined focal length of the at least one negative lens) is denoted by F1n.

If Conditional Expression (1) is not satisfied, refractive power of one of the positive lens unit G1p and the negative lens unit G1n becomes too large as compared with that of the other, and it becomes difficult to realize a more satisfactory telecentric property on the object side of the optical system 100. Furthermore, the following Conditional Expressions (1a) and (1b) are sequentially satisfied:

$$-3.5 < F1p/F1n < -0.3 \qquad (1a), \text{ and}$$

$$-3.2 < F1p/F1n < -0.4 \qquad (1b).$$

In addition, the following Conditional Expression (2) is satisfied:

$$-17 < F/Fa < -1.2 \qquad (2),$$

where a focal length of (the entire system of) the optical system 100 is denoted by F, and a focal length of an air lens formed between the first lens unit G1 and the second lens unit G2 is denoted by Fa.

If a value of F/Fa falls below a lower limit of Conditional Expression (2), an absolute value of refractive power of the air lens becomes too large, and it becomes difficult to correct various aberrations in the optical system 100 or it becomes difficult to realize a more satisfactory telecentric property on the object side. If a value of F/Fa exceeds an upper limit of Conditional Expression (2), an absolute value of refractive power of the air lens becomes too small, and it becomes difficult to further shorten the total length of the optical system 100. Furthermore, the following Conditional Expressions (2a) and (2b) are sequentially satisfied:

$$-15 < F/Fa < -1.3 \qquad (2a), \text{ and}$$

$$-13 < F/Fa < -1.5 \qquad (2b).$$

In addition, the following Conditional Expression (3) is satisfied:

$$0.5 < F/F2 < 3.5 \qquad (3),$$

where a focal length of the second lens unit G2 is denoted by F2.

If a value of F/F2 falls below a lower limit of Conditional Expression (3), an absolute value of refractive power of the second lens unit G2 becomes too small, and it becomes difficult to further shorten the total length of the optical system 100. If a value of F/F2 exceeds an upper limit of Conditional Expression (3), an absolute value of refractive power of the second lens unit G2 becomes too large, and it becomes difficult to correct various aberrations in the optical system 100. Furthermore, the following Conditional Expressions (3a) and (3b) are sequentially satisfied:

$$0.7 < F/F2 < 3.2 \qquad (3a), \text{ and}$$

$$0.8 < F/F2 < 3.0 \qquad (3b).$$

As described above, with the optical system 100 according to the present exemplary embodiment, satisfactory optical performance can be realized while the entire system is downsized. In particular, because a satisfactory telecentric property on the object side can be obtained, when the optical system 100 is applied to an imaging apparatus or an imaging system including a plurality of lens units and a plurality of filters, a satisfactory image can be acquired.

[Imaging System]

Figure 2A:
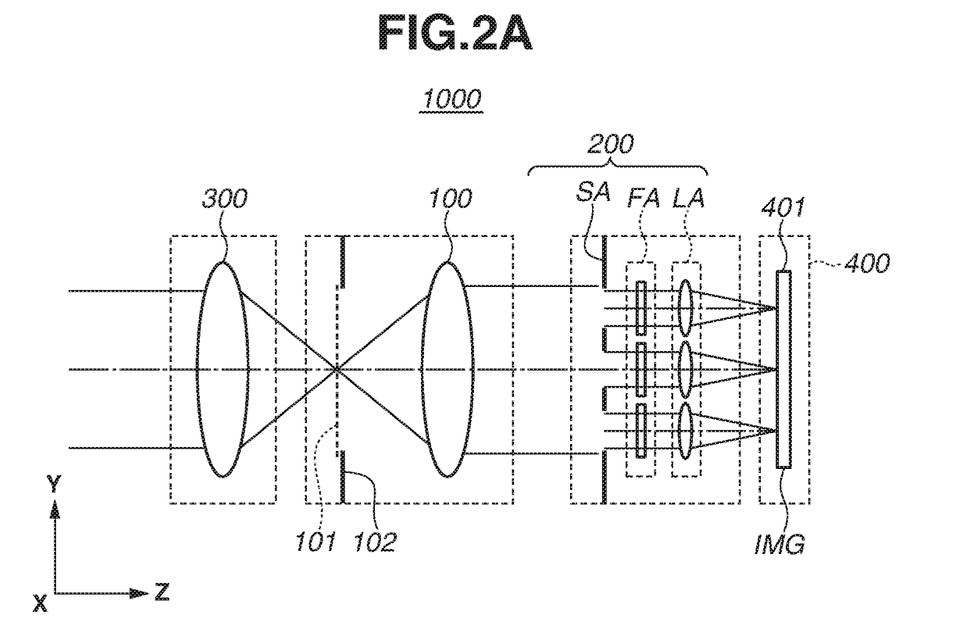
FIG. 2A is a schematic diagram (YZ cross-section) illustrating an imaging system according to an exemplary embodiment.
Figure 2B:
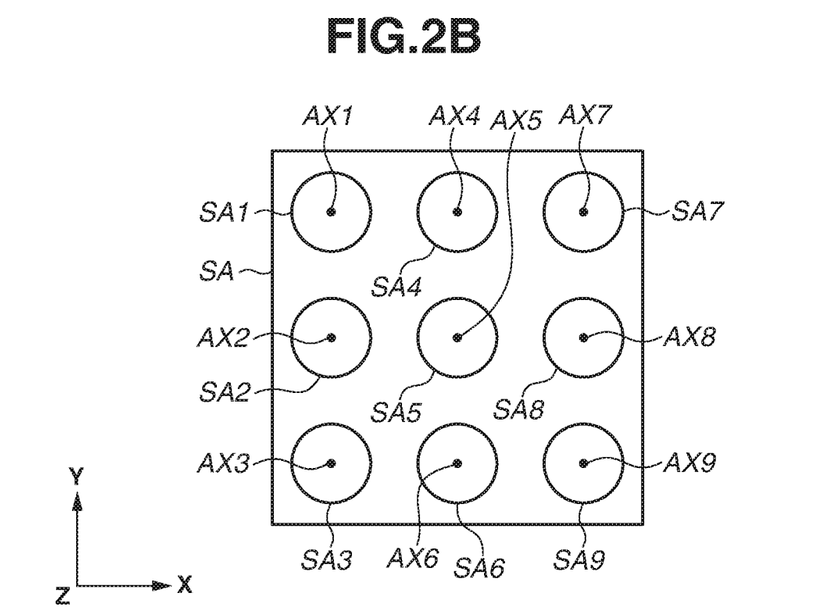
FIG. 2B is a front view illustrating a stop array according to an exemplary embodiment viewed from an object side.

FIGS. 2A and 2B are schematic diagrams of an imaging system 1000 according to an exemplary embodiment of the disclosure. The imaging system 1000 according to the present exemplary embodiment includes the aforementioned optical system 100, an optical apparatus 200 disposed on the image side of the optical system 100, a lens apparatus 300 disposed on the object side of the optical system 100, and an imaging apparatus 400 including an image sensor 401. FIG. 2A illustrates a cross-section (YZ cross-section) including an optical axis (main optical axis) of the optical system 100 and the lens apparatus 300, and FIG. 2B illustrates a front view of the stop array SA viewed from the object side. In addition, in FIG. 2A, the illustration of the respective lens configurations of the optical system 100, the optical apparatus 200, and the lens apparatus 300 is omitted for the sake of convenience.

The optical apparatus 200 includes a lens array LA including a plurality of lens units, a filter array FA including a plurality of filters disposed on optical axes of the plurality of lens units, and the stop array SA including a plurality of apertures stops disposed on the optical axes of the plurality of lens units. In the present exemplary embodiment, the optical apparatus 200 has a configuration attachable to and detachable from the imaging apparatus 400 as an accessory apparatus. With this configuration, different pieces of image information can be acquired only by replacing the optical apparatus 200. The optical apparatus 200 and the image sensor 401 may be integrally formed as an imaging apparatus as necessary.

Each of the plurality of lens units according to the present exemplary embodiment includes one or more lenses, and each lens forms an image of an object on an image plane IMG (imaging plane of the image sensor 401) via the optical system 100. In other words, on the image plane IMG of the optical apparatus 200, a plurality of images (image array) of an object is formed by the plurality of lens units. That is, with the lens array LA, duplicate images of the same object can be formed.

In addition, for facilitating the manufacturing and arrangement, the plurality of lens units may be integrally formed, or may be separately formed for enabling individual position adjustment (focus adjustment, etc.). In addition, all the lens units include lens surfaces having the same shape. With this configuration, manufacturing of each lens unit becomes easier, and the cost of the lens array LA can be saved. In one embodiment, the shapes of the lens units are the same, but the shapes of the lens units may be made mutually different as necessary.

The plurality of filters (optical filters) according to the present exemplary embodiment includes two or more filters having mutually different transmission characteristics. The transmission characteristics in this specification refer to optical characteristics that change the state of incident light, such as a wavelength band of light to be transmitted (transmission wavelength region), a direction or a type of polarized light to be transmitted (polarization state), or the intensity of transmitted light with respect to the intensity of incident light (transmittance). By the filter array FA including the plurality of filters having mutually different transmission characteristics, a plurality of pieces of mutually different image information can be simultaneously acquired regarding the same object.

The filter array FA include at least two filters (first and second filters) having mutually different transmission characteristics. In other words, two or more filters having the same transmission characteristics may be included. To acquire a larger number of a plurality of pieces of mutually different image information in one image capturing, the transmission characteristics of all the plurality of filters are made different from one another. In addition, each of the plurality of filters may include a plurality of optical filters as necessary.

For example, by using a plurality of filters (bandpass filters) having mutually different center wavelengths of transmission wavelength regions, a plurality of pieces of image information corresponding to a plurality of wavelength bands can be simultaneously acquired. In one embodiment, the imaging system 1000 is served as a multispectral camera that can acquire pieces of image information corresponding to wavelength bands of four types or more that are larger than wavelength bands (RGB) of a general camera. Furthermore, the imaging system 1000 is served as a hyperspectral camera that can acquire pieces of image information corresponding to wavelength bands of 100 types or more. In addition, in place of a bandpass filter, a wavelength conversion filter that converts the wavelength of incident light and emits the resultant light may be used.

Alternatively, by using a plurality of polarizing filters having mutually different types, a plurality of pieces of image information corresponding to a plurality of polarization states can be simultaneously acquired. Examples include a case using three linear polarizing filters that let through linear polarized light rays emitted in directions parallel to an X direction (horizontal direction), a Y direction (vertical direction), and a direction at 45° relative to the X direction and the Y direction, and a circularly polarizing filter that lets through circularly polarized light. By using a plurality of types of polarizing filters that change the polarization state of incident light, in this manner, polarization information such as polarization characteristics (Stokes parameters) of an object, or a two-dimensional distribution of polarization states of an object can be acquired.

In addition, by the filter array FA including a plurality of filters having different types of transmission characteristics, different types of information such as wavelength information, polarization information, luminance information, or parallax information may be enabled to be simultaneously acquired. In such a case, a configuration is not limited to a configuration in which a plurality of filters having mutually different types is disposed on optical axes of mutually different lens units, and a configuration in which a plurality of filters is disposed on the same optical axis may be employed. In the latter configuration, pieces of acquired image information can be separated into different types of image information by performing filtering using an image processing unit (not illustrated).

Each of the plurality of aperture stops according to the present exemplary embodiment includes a light shielding member provided with an aperture, and thus each F-number (Fno) of a corresponding one of the plurality of lens units is determined by restricting the width of light from the object side. As illustrated in FIG. 2B, in the present exemplary embodiment, a plurality of apertures stops is integrally formed by providing a plurality of apertures SA1 to SA9 in one light shielding member, but a plurality of apertures stops may be separately formed as necessary. In addition, the stop array SA may be disposed on the outside of the optical apparatus 200 as necessary.

As illustrated in FIG. 2B, the optical apparatus 200 according to the present exemplary embodiment includes nine lens units, and nine filters and nine aperture stops that are disposed on optical axes AX1 to AX9 of the respective lens units. That is, if members disposed on the same optical axis are collectively regarded as one image forming unit, the optical apparatus 200 includes nine image forming units. A plurality of image forming units will also be collectively referred to as an image forming unit array. The number of image forming units is not limited to this, and the optical apparatus 200 at least includes two image forming units. To acquire a larger number of pieces of image information in one image capturing, in one embodiment, four or more image forming units are provided, and in another embodiment, nine or more image forming units are provided as in the present exemplary embodiment.

Light from the object sequentially passes through the stop array SA, the filter array FA, and the lens array LA, and reaches the image plane IMG. At this time, nine images corresponding to the respective aperture stops in the stop array SA and the respective filters in the filter array FA are formed on the image plane IMG. In addition, the arrangement order in an optical axis direction (Z direction) of the members is not limited to the order illustrated in FIG. 2A. For example, the stop array SA or the filter array FA may be disposed on the image side of the lens array LA as necessary.

At the position of the image plane IMG of the optical apparatus 200, an imaging plane (light-receiving surface) of the image sensor 401 is disposed. To downsize the imaging system 1000, a single image sensor shared by the image forming units is provided. Image sensors may be individually provided for the respective image forming units as necessary. In addition, to downsize the entire apparatus, the image forming units in accordance with the shape of the imaging plane is disposed. Specifically, as illustrated in FIG. 2B, the image forming units in a square shape in an XY cross-section is disposed. If the imaging plane does not have a square shape, an aspect ratio of the arrangement of image forming units, or the like may be changed.

In the case of using the optical apparatus 200 including a plurality of image forming units, parallax occurs among a plurality of images of an object due to a difference in incident angle of light entering the image forming units. In view of the foregoing, in the present exemplary embodiment, by disposing the optical system 100 shared by the image forming units, on the object side of the optical apparatus 200, a difference in incident angle of light entering the image forming units is reduced, and parallax occurring among a plurality of images is reduced or prevented. As mentioned above, according to the optical system 100, because a satisfactory telecentric property on the object side can be obtained while downsizing the entire system, downsizing of the entire imaging system 1000 and the acquisition of a satisfactory image can be realized.

The lens apparatus 300 according to the present exemplary embodiment includes one or more lenses, and includes an image forming optical system (optical unit) that forms an intermediate image of an object. In the present exemplary embodiment, an image plane (intermediate image plane) of the lens apparatus 300 and the object surface 101 of the aforementioned optical system 100 coincide with each other. In this manner, with a configuration of forming an intermediate image of an object at a position closer to the object than the optical system 100, a field stop 102 can be disposed near the intermediate image plane. With this configuration, a field of view of each image forming unit in the optical apparatus 200 can be restricted, and a plurality of images can be prevented from overlapping each other on the image plane IMG. In this case, the optical system 100 and the lens apparatus 300 both have positive refractive power.

In addition, the optical system 100, the filter array FA, and the lens array LA may be integrally formed as one image forming optical system. At this time, members included in the image forming optical system may have a configuration integrally held by a holding member (casing) (not illustrated), and attachable to and detachable from the imaging apparatus 400 as an accessory apparatus. Alternatively, the image forming optical system may be integrally formed with the imaging apparatus 400. In addition, the optical system 100 may be an accessory apparatus (adapter apparatus) separated from the optical apparatus 200, and may have a configuration attachable to and detachable from the optical apparatus 200. With this configuration, the optical system 100 can be replaced in accordance with the configuration of the lens apparatus 300.

In addition, the lens apparatus 300 may be integrally formed with the optical system 100 and the optical apparatus 200, and regarded as an accessory apparatus attachable to and detachable from the imaging apparatus 400. Alternatively, the lens apparatus 300 and the optical system 100 may be integrally formed, and regarded as a lens apparatus attachable to and detachable from the optical apparatus 200. Alternatively, the lens apparatus 300 may have a configuration attachable to and detachable from the optical system 100. By the lens apparatus 300 having a configuration attachable to and detachable from the optical system 100, a field angle, optical performance, or the like of the imaging system 1000 can be easily changed by the replacement of the lens apparatus 300.

For a similar reason, the field stop 102 also has a configuration attachable to and detachable from the lens apparatus 300 as an accessory apparatus by being held integrally with the optical system 100. In such a case, a diffusing member (diffusing plate) is provided in an aperture portion of the field stop 102. With this configuration, vignetting or eclipsing in a field of view of the optical apparatus 200 can be reduced or prevented when a telecentric property or an F-number of the lens apparatus 300 is changed by the replacement of the lens apparatus 300. In the case of employing this configuration, resolution to be acquired from image information declines as compared with a configuration in which a diffusing member is not provided in an aperture portion of the field stop 102. Thus, the determination of whether to employ this configuration may depend on required specification.

The imaging system 1000 according to the present exemplary embodiment that is illustrated in FIG. 2 employs a configuration in which the lens apparatus 300, the field stop 102 and the optical system 100, the optical apparatus 200, and the imaging apparatus 400 are attachable to and detachable from one another. That is, in the present exemplary embodiment, the field stop 102 and the optical system 100, and the optical apparatus 200 are regarded as an adapter apparatus and an accessory apparatus. In such a configuration, with the optical system 100 having a satisfactory telecentric property with respect to the intermediate image plane, eclipsing of effective beams when the lens apparatus 300 is replaced can be reduced or prevented.

In addition, when the apparatuses are attachable to and detachable from one another, a mount portion (coupling portion) is provided on a holding member (casing) holding each member. The shapes of mount portions are compatible with each other. In addition, each mount portion is provided with an electrical contact (terminal) for electrically connecting the apparatuses. With the configuration, the apparatuses can communicate with each other and supply or receive power, via the electrical contact. Furthermore, each apparatus is provided with a communication unit for transmitting and receiving information to and from each other, and a recognition unit for recognizing connection with each other.

In such a case, the lens apparatus 300 serving as an interchangeable lens capable of being attached to and detached from (detachably mountable to) the imaging apparatus 400 has a configuration attachable to and detachable from the optical system 100. More specifically, the shape of a mount portion provided on the object side of a holding member holding the optical system 100 is compatible with a mount portion provided on the lens apparatus 300, and is the same shape as a mount portion provided on the imaging apparatus 400. Accordingly, an imaging system that can simultaneously acquire a plurality of pieces of image information in one image capturing can be easily formed, by attaching the optical system 100 and the optical apparatus 200 to a general pair of the imaging apparatus 400 and the lens apparatus 300.

First Exemplary Embodiment

Hereinafter, an imaging system 1000 according to a first exemplary embodiment of the disclosure will be described. In the imaging system 1000 according to the present exemplary embodiment, the descriptions of configurations equivalent to those in the imaging system 1000 according to the aforementioned exemplary embodiment will be omitted.

Figure 3:
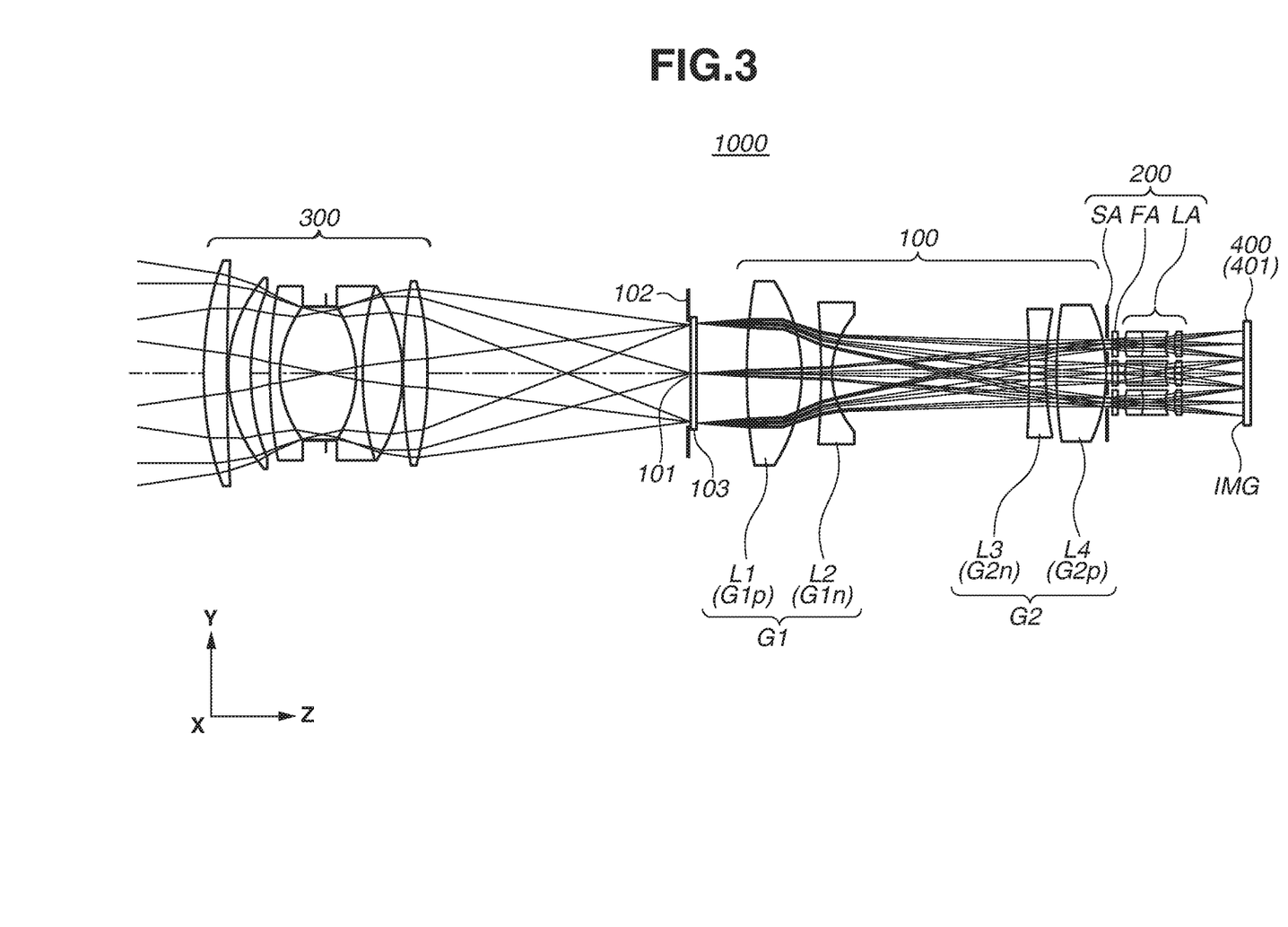
FIG. 3 is a main part schematic diagram illustrating an imaging system according to a first exemplary embodiment.

FIG. 3 is a main part schematic diagram illustrating the imaging system 1000 according to the present exemplary embodiment in a YZ cross-section including a main optical axis. As for the lens apparatus 300 according to the present exemplary embodiment, a focal length is 50 mm and an F-number is 1.8. A diffusing member 103 is provided in an aperture portion of the field stop 102 according to the present exemplary embodiment. An angle of each principal ray of an effective beam with respect to the optical system 100 according to the present exemplary embodiment is 0.1 degrees or less. The optical system 100 is configured to convert light diffused by the diffusing member 103 (corresponding to F-number 2.9), into parallel light, and set an incident angle of each ray with respect to the stop array SA to 10 degrees or less.

The optical apparatus 200 according to the present exemplary embodiment includes 12 image forming units in total arrayed in four columns arranged in the X direction and in three rows arranged in the Y direction. The center wavelengths of transmission wavelength regions of all the filters in the filter array FA according to the present exemplary embodiment are different from one another. Specifically, widths of transmission wavelength regions of the respective filters are all 50 nm, and the center wavelengths of the transmission wavelength regions of the respective filters gradually increase at 50 nm-intervals from the shortest wavelength being 425 nm up to the longest wavelength being 975 nm. That is, a use wavelength region of the imaging system 1000 according to the present exemplary embodiment is 400 nm to 1000 nm. In addition, as for each lens unit in the lens array LA according to the present exemplary embodiment, a focal length is 19.6 mm and an F-number is 6.2.

The first lens unit G1 according to the present exemplary embodiment has negative refractive power, and includes a positive lens L1 and a negative lens L2 that are disposed in order from the object side to the image side. The second lens unit G2 according to the present exemplary embodiment has positive refractive power, and includes a negative lens L3 and a positive lens L4 that are disposed in order from the object side to the image side. Wavefront aberration occurring in the optical system 100 according to the present exemplary embodiment is 100 mλRMS or less, and is satisfactorily corrected to 200 mλRMS or less even in combination with wavefront aberration of each image forming unit in the optical apparatus 200.

Hereinafter, an imaging system 1000 according to a second exemplary embodiment of the disclosure will be described. In the imaging system 1000 according to the present exemplary embodiment, the descriptions of configurations equivalent to those in the imaging system 1000 according to the aforementioned first exemplary embodiment will be omitted.

Figure 4:
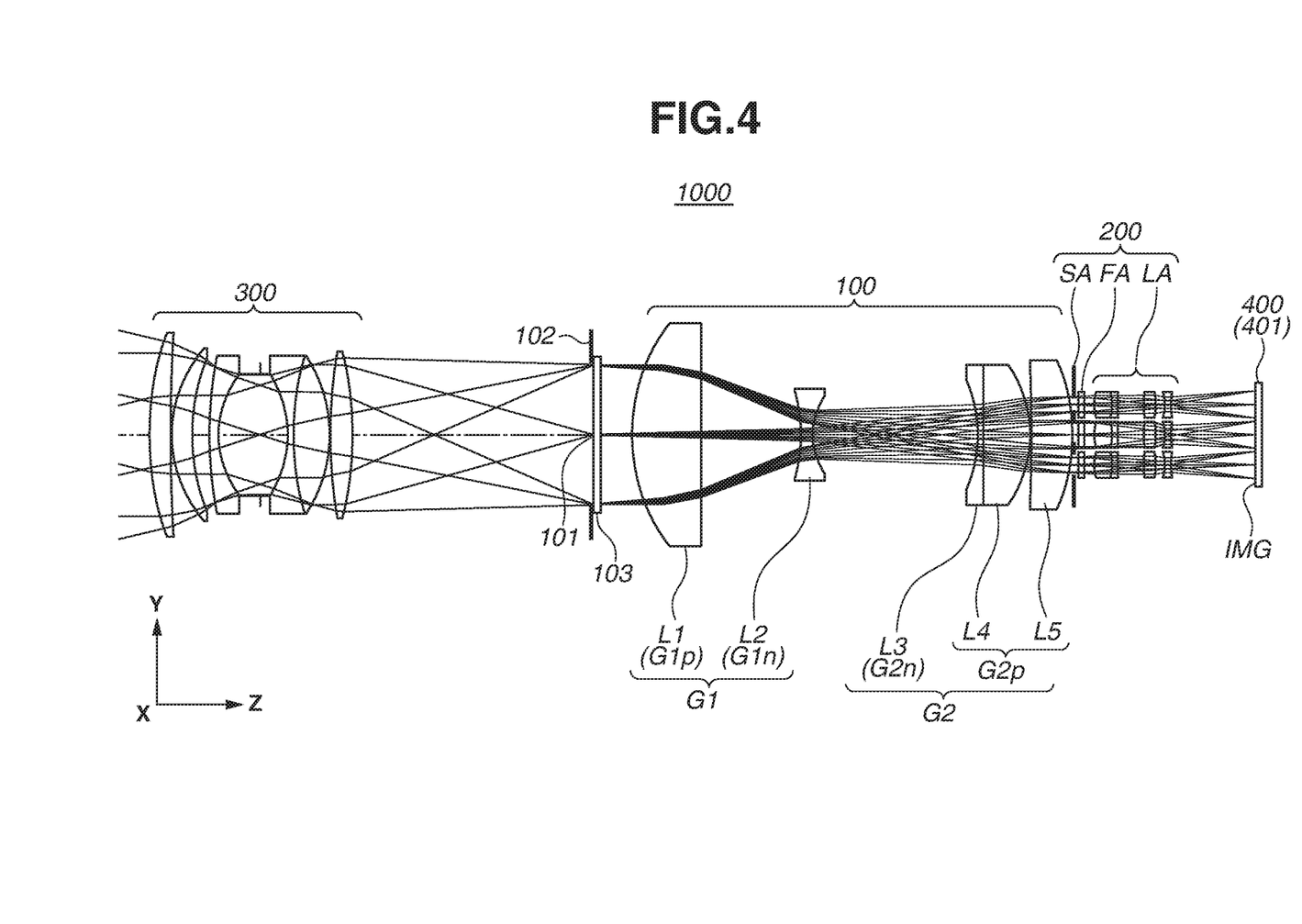
FIG. 4 is a main part schematic diagram illustrating an imaging system according to a second exemplary embodiment.

FIG. 4 is a main part schematic diagram illustrating the imaging system 1000 according to the present exemplary embodiment in the YZ cross-section including a main optical axis. An angle of each principal ray of an effective beam with respect to the optical system 100 according to the present exemplary embodiment is 2.2 degrees or less. The optical system 100 is configured to convert light diffused by the diffusing member 103 (corresponding to F-number 6.2), into parallel light, and set an incident angle of each ray with respect to the stop array SA to 5.7 degrees or less. In addition, as for each lens unit in the lens array LA according to the present exemplary embodiment, a focal length is 33.6 mm and an F-number is 10.0.

The first lens unit G1 according to the present exemplary embodiment has negative refractive power, and includes a positive lens L1 and a negative lens L2 that are disposed in order from the object side to the image side. The second lens unit G2 according to the present exemplary embodiment has positive refractive power, and includes a negative lens L3, a positive lens L4, and a positive lens L5 that are disposed in order from the object side to the image side. In addition, the negative lens L3 and the positive lens L4 are cemented to each other. Wavefront aberration occurring in the optical system 100 according to the present exemplary embodiment is 150 mλRMS or less, and is satisfactorily corrected to 250 mλRMS or less even in combination with wavefront aberration of each image forming unit in the optical apparatus 200.

Hereinafter, an imaging system 1000 according to a third exemplary embodiment of the disclosure will be described. In the imaging system 1000 according to the present exemplary embodiment, the descriptions of configurations equivalent to those in the imaging system 1000 according to the aforementioned first exemplary embodiment will be omitted.

Figure 5:
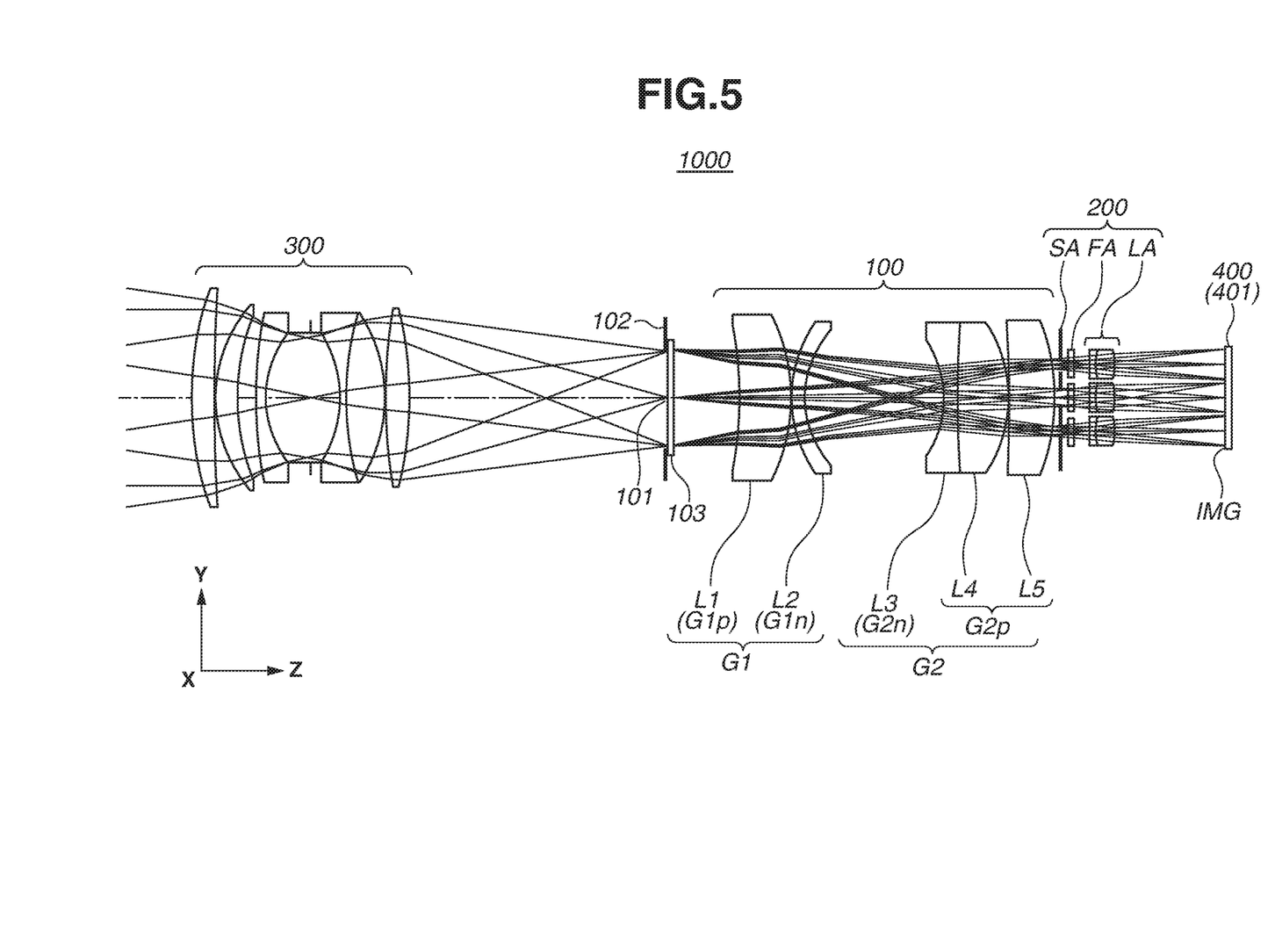
FIG. 5 is a main part schematic diagram illustrating an imaging system according to a third exemplary embodiment.

FIG. 5 is a main part schematic diagram illustrating the imaging system 1000 according to the present exemplary embodiment in the YZ cross-section including a main optical axis. An angle of each principal ray of an effective beam with respect to the optical system 100 according to the present exemplary embodiment is 8.8 degrees or less. The optical system 100 is configured to convert light diffused by the diffusing member 103 (corresponding to F-number 2.0), into parallel light, and set an incident angle of each ray with respect to the stop array SA to 5.7 degrees or less. In addition, as for each lens unit in the lens array LA according to the present exemplary embodiment, a focal length is 17.2 mm and an F-number is 12.0.

The first lens unit G1 according to the present exemplary embodiment has positive refractive power, and includes a positive lens L1 and a negative lens L2 that are disposed in order from the object side to the image side. The second lens unit G2 according to the present exemplary embodiment has positive refractive power, and includes a negative lens L3, a positive lens L4, and a positive lens L5 that are disposed in order from the object side to the image side. In addition, the negative lens L3 and the positive lens L4 are cemented to each other. Wavefront aberration generated in the optical system 100 according to the present exemplary embodiment is 250 mλRMS or less, and is satisfactorily corrected to 300 mλRMS or less even in combination with wavefront aberration of each image forming unit in the optical apparatus 200.

Hereinafter, an imaging system 1000 according to a fourth exemplary embodiment of the disclosure will be described. In the imaging system 1000 according to the present exemplary embodiment, the descriptions of configurations equivalent to those in the imaging system 1000 according to the aforementioned first exemplary embodiment will be omitted.

Figure 6:
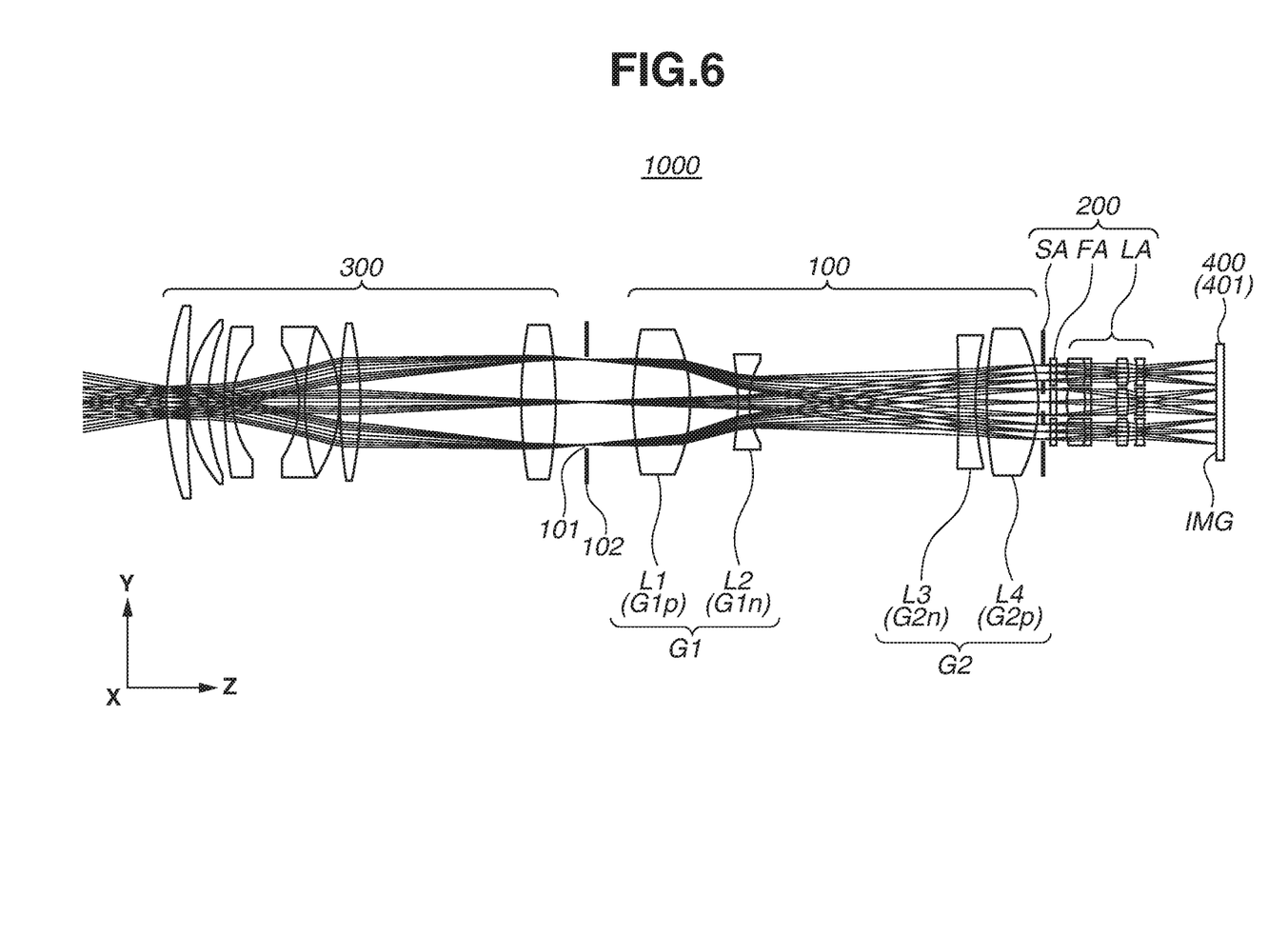
FIG. 6 is a main part schematic diagram illustrating an imaging system according to a fourth exemplary embodiment.

FIG. 6 is a main part schematic diagram illustrating the imaging system 1000 according to the present exemplary embodiment in the YZ cross-section including a main optical axis. The lens apparatus 300 according to the present exemplary embodiment employs a configuration in which one positive lens disposed at the position adjacent to the object side of the field stop 102 is added to the configuration of the lens apparatus 300 according to the first exemplary embodiment. In addition, a diffusing member is not provided in an aperture portion of the field stop 102 according to the present exemplary embodiment. In this manner, in a configuration in which a diffusing member is not provided in an aperture portion of the field stop 102, an effect similar to that caused by a configuration in which a diffusing member is provided in an aperture portion of the field stop 102 can also be obtained, by disposing a positive lens serving as a field lens, immediately in front of the field stop 102.

An angle of each principal ray of an effective beam with respect to the optical system 100 according to the present exemplary embodiment is 0.1 degrees or less. The optical system 100 is configured to convert light from the intermediate image plane (corresponding to F-number 4.0) into parallel light, and set an incident angle of each ray with respect to the stop array SA to 5.7 degrees or less. In addition, as for each lens unit in the lens array LA according to the present exemplary embodiment, a focal length is 33.6 mm and an F-number is 10.0.

The first lens unit G1 according to the present exemplary embodiment has negative refractive power, and includes a positive lens L1 and a negative lens L2 that are disposed in order from the object side to the image side. The second lens unit G2 according to the present exemplary embodiment has positive refractive power, and includes a negative lens L3 and a positive lens L4 that are disposed in order from the object side to the image side. Wavefront aberration occurring in the optical system 100 according to the present exemplary embodiment is 200 mλRMS or less, and is satisfactorily corrected to 300 mλRMS or less even in combination with wavefront aberration of each image forming unit in the optical apparatus 200.

NUMERICAL EXAMPLES

Hereinafter, Numerical Examples 1 to 4 corresponding to the aforementioned first to fourth exemplary embodiments will be described. In each numerical example, a surface number is an ordinal number of each optical surface counted from the object side toward the image side. In addition, r [mm] denotes a curvature radius of an ith optical surface, and d [mm] denotes an interval between the ith optical surface and an (i+1)th optical surface. In addition, Nd and vd respectively denote refractive index and Abbe number with respect to light with wavelength 587.6 nm (d-line) of medium (material) between the ith optical surface and the (i+1)th optical surface.

In each numerical example, surface data of optical surfaces are listed separately for each of the lens apparatus 300, the optical system 100, and the optical apparatus 200. Since the configurations of image forming units in the optical apparatus 200 are the same, surface data of only one image forming unit are listed. In addition, in Numerical Examples 2 and 3, since surface data regarding the lens apparatus 300 are the same as those in Numerical Example 1, the surface data are omitted.

Numerical Example 1

| Surface number | r | d | Nd | vd |
|---|---|---|---|---|
| Lens Apparatus 300 | | | | |
| 1 | 49.66 | 3.50 | 1.744 | 44.8 |
| 2 | 239.14 | 0.15 | | |
| 3 | 20.62 | 3.50 | 1.744 | 44.8 |
| 4 | 33.19 | 2.89 | | |
| 5 | 66.68 | 1.50 | 1.673 | 32.1 |
| 6 | 16.18 | 7.05 | | |
| 7 (stop) | ∞ | 4.47 | | |
| 8 | −17.61 | 1.00 | 1.699 | 30.1 |
| 9 | 46.50 | 6.00 | 1.744 | 44.8 |
| 10 | −22.90 | 0.15 | | |
| 11 | 82.97 | 3.60 | 1.744 | 44.8 |
| 12 | −57.56 | 39.90 | | |
| Optical System 100 | | | | |
| 1 | ∞ | 9.00 | | |
| 2 | 86.89 | 10.00 | 1.658 | 57.3 |
| 3 | −28.68 | 3.46 | | |
| 4 | −149.23 | 2.00 | 1.516 | 64.1 |
| 5 | 15.32 | 35.64 | | |
| 6 | −421.03 | 3.00 | 1.755 | 27.5 |
| 7 | 50.51 | 1.89 | | |
| 8 | 68.89 | 9.00 | 1.620 | 60.3 |
| 9 | −28.53 | 0.15 | | |
| 10 (stop) | ∞ | | | |
| Optical Apparatus 200 | | | | |
| 1 (stop) | ∞ | 1.00 | | |
| 2 | ∞ | 1.00 | 1.516 | 64.1 |
| 3 | ∞ | 1.20 | | |
| 4 | 7.00 | 3.38 | 1.670 | 47.2 |
| 5 | −5.59 | 3.97 | 1.720 | 34.7 |
| 6 | 4.86 | 1.67 | | |
| 7 | 8.75 | 1.28 | 1.744 | 44.8 |
| 8 | −1010.98 | 11.09 | | |

Numerical Example 2

| Surface number | r | d | Nd | vd |
|---|---|---|---|---|
| Optical System 100 | | | | |
| 1 | ∞ | 5.00 | | |
| 2 | 30.30 | 12.00 | 1.740 | 28.3 |
| 3 | −1780.11 | 17.00 | | |
| 4 | −26.30 | 2.00 | 1.589 | 61.1 |
| 5 | 10.91 | 28.45 | | |
| 6 | −22.49 | 1.00 | 1.738 | 32.3 |
| 7 | ∞ | 8.00 | 1.487 | 70.2 |
| 8 | −20.08 | 0.15 | | |
| 9 | −341.44 | 7.00 | 1.620 | 60.3 |
| 10 | −31.91 | 0.15 | | |
| 11 (stop) | ∞ | | | |
| Optical Apparatus 200 | | | | |
| 1 (stop) | ∞ | 2.00 | | |
| 2 | ∞ | 1.00 | 1.516 | 64.1 |
| 3 | ∞ | 2.00 | | |
| 4 | 8.58 | 3.00 | 1.569 | 56.4 |
| 5 | −8.34 | 1.00 | 1.699 | 30.1 |
| 6 | 30.74 | 4.50 | | |
| 7 | 16.91 | 2.00 | 1.755 | 27.5 |
| 8 | −11.60 | 1.60 | | |
| 9 | −6.29 | 1.11 | 1.749 | 35.3 |
| 10 | 14.75 | 14.03 | | |

Numerical Example 3

| Surface number | r | d | Nd | vd |
|---|---|---|---|---|
| Optical System 100 | | | | |
| 1 | ∞ | 10.00 | | |
| 2 | −60.32 | 8.00 | 1.749 | 35.3 |
| 3 | −28.74 | 0.15 | | |
| 4 | 19.82 | 2.00 | 1.487 | 70.2 |
| 5 | 15.30 | 21.75 | | |
| 6 | −15.84 | 2.08 | 1.722 | 29.2 |
| 7 | 154.02 | 8.00 | 1.613 | 58.7 |
| 8 | −20.68 | 0.15 | | |
| 9 | −162.02 | 7.00 | 1.744 | 44.8 |
| 10 | −33.54 | 0.15 | | |
| 11 (stop) | ∞ | | | |
| Optical Apparatus 200 | | | | |
| 1 (stop) | ∞ | 2.00 | | |
| 2 | ∞ | 1.00 | 1.516 | 64.1 |
| 3 | ∞ | 2.31 | | |
| 4 | 148.28 | 1.00 | 1.689 | 31.1 |
| 5 | 8.53 | 3.00 | 1.642 | 58.4 |
| 6 | −10.91 | 17.05 | | |

Numerical Example 4

| Surface number | r | d | Nd | vd |
|---|---|---|---|---|
| Lens Apparatus 300 | | | | |
| 1 | 49.66 | 3.50 | 1.744 | 44.8 |
| 2 | 239.14 | 0.15 | | |
| 3 | 20.62 | 3.50 | 1.744 | 44.8 |
| 4 | 33.19 | 2.89 | | |
| 5 | 66.68 | 1.50 | 1.673 | 32.1 |
| 6 | 16.18 | 7.05 | | |
| 7 (stop) | ∞ | 4.47 | | |
| 8 | −17.61 | 1.00 | 1.699 | 30.1 |

-continued

| Surface number | r | d | Nd | vd |
|---|---|---|---|---|
| 9 | 46.50 | 6.00 | 1.744 | 44.8 |
| 10 | −22.90 | 0.15 | | |
| 11 | 82.97 | 3.60 | 1.744 | 44.8 |
| 12 | −57.56 | 28.13 | | |
| 13 | 76.19 | 6.00 | 1.516 | 64.1 |
| 14 | −76.92 | 4.49 | | |
| Optical System 100 | | | | |
| 1 | ∞ | 9.00 | | |
| 2 | 56.56 | 10.00 | 1.581 | 40.7 |
| 3 | −28.95 | 8.33 | | |
| 4 | −49.18 | 2.00 | 1.620 | 60.3 |
| 5 | 14.05 | 36.57 | | |
| 6 | −584.61 | 3.00 | 1.755 | 27.5 |
| 7 | 48.17 | 1.94 | | |
| 8 | 65.96 | 9.00 | 1.620 | 60.3 |
| 9 | −28.24 | 0.15 | | |
| 10 (stop) | ∞ | | | |
| Optical Apparatus 200 | | | | |
| 1 (stop) | ∞ | 2.00 | | |
| 2 | ∞ | 1.00 | 1.516 | 64.1 |
| 3 | ∞ | 2.00 | | |
| 4 | 8.58 | 3.00 | 1.569 | 56.4 |
| 5 | −8.34 | 1.00 | 1.699 | 30.1 |
| 6 | 30.74 | 4.50 | | |
| 7 | 16.91 | 2.00 | 1.755 | 27.5 |
| 8 | −11.60 | 1.60 | | |
| 9 | −6.29 | 1.11 | 1.749 | 35.3 |
| 10 | 14.75 | 14.03 | | |

Table 1 lists numerical values regarding each conditional expression in a different one of the exemplary embodiments (numerical examples). As listed in Table 1, each conditional expression is satisfied in all the exemplary embodiments.

TABLE 1

| | First Exemplary Embodiment | Second Exemplary Embodiment | Third Exemplary Embodiment | Fourth Exemplary Embodiment |
|---|---|---|---|---|
| F1p | 34.41 | 41.48 | 67.66 | 35.08 |
| F1n | −27.17 | −13.01 | −163.02 | −17.65 |
| (1) F1p/F1n | −1.27 | −3.19 | −0.42 | −1.99 |
| F | 78.39 | 166.69 | 54.83 | 109.60 |
| Fa | −46.82 | −12.86 | −16.04 | −37.06 |
| (2) F/Fa | −1.67 | −12.97 | −3.42 | −2.96 |
| F2 | 63.00 | 56.40 | 64.09 | 61.35 |
| (3) F/F2 | 1.24 | 2.96 | 0.86 | 1.79 |

Modified Example

Hereinbefore, exemplary embodiments of the disclosure have been described, but the disclosure is not limited to these exemplary embodiments, and various combinations, modifications, and changes can be made without departing from the scope of the disclosure.

In the aforementioned exemplary embodiments, the description has been given of a configuration in which each image forming unit includes a lens unit, a filter, and an aperture stop, but an image forming unit not including a filter or an aperture stop may be provided as necessary. For example, when only luminance information of light from an object is desired to be acquired using a partial image forming unit, a configuration in which a filter is not provided in the image forming unit may be employed.

An image sensor is not limited to an image sensor configured to photoelectrically convert visible light, such as a charge-coupled device (CCD) sensor or a complementary metal-oxide semiconductor (CMOS) sensor, and may be configured to photoelectrically convert infrared light (near-infrared light or far-infrared light) or the like. For example, an image sensor that uses material such as InGaAs or InAsSb may be employed in accordance with a use wavelength band. In addition, the number of pixels of an image sensor based on resolution required in an imaging system is to be determined.

In addition, an imaging system may include an image processing unit that generates an image based on image information output from an image sensor. The image processing unit is a processor such as a central processing unit (CPU), for example, and may be provided on the inside or the outside of each imaging apparatus. For example, by generating a plurality of pieces of image information by the image sensor photoelectrically converting a plurality of images (copy images) corresponding to mutually different wavelength bands that have been formed by the respective image forming units, and by the image processing unit combining (superimposing) the plurality of pieces of image information, one multispectral image can be obtained.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-195423, filed Oct. 16, 2018, which is hereby incorporated by reference herein in its entirety.

What is claimed is:

1. An optical system for converting light from an object into parallel light, the optical system comprising:
a first lens unit having positive or negative refractive power and a second lens unit having positive refractive power that are disposed in order from an object side,
wherein the first lens unit and the second lens unit are disposed at a widest interval in the optical system,
wherein the first lens unit consists of at least one positive lens and at least one negative lens that are disposed in order from the object side, and
wherein the following conditional expression is satisfied:

$-17<F/Fa<-1.2,$ where a focal length of the optical system is denoted by F, and a focal length of an air lens formed between the first lens unit and the second lens unit is denoted by Fa.

2. The optical system according to claim 1, wherein the second lens unit consists of at least one negative lens and at least one positive lens that are disposed in order from the object side.

3. The optical system according to claim 1, wherein, in the first lens unit, the following conditional expression is satisfied:

$-4.0<F1p/F1n<-0.2,$ where a combined focal length of the at least one positive lens is denoted by F1$p$, and a combined focal length of the at least one negative lens is denoted by F1$n$.

4. The optical system according to claim 1, wherein the following conditional expression is satisfied:

$0.5<F/F<3.5,$ where a focal length of the optical system is denoted by F, and a focal length of the second lens unit is denoted by F2.

5. The optical system according to claim 1, wherein the first lens unit consists of a positive lens and a negative lens that are disposed in order from the object side.

6. The optical system according to claim 1, wherein the second lens unit consists of a negative lens and a positive lens that are disposed in order from the object side.

7. The optical system according to claim 1, wherein the second lens unit consists of a negative lens, a positive lens, and a positive lens that are disposed in order from the object side.

8. An image forming optical system comprising:
the optical system according to claim 1; and
a plurality of image forming units.

9. The image forming optical system according to claim 8, wherein the plurality of image forming units includes first and second filters having mutually different transmission characteristics.

10. The image forming optical system according to claim 8, further comprising an optical unit that is disposed closer to an object than the optical system, and configured to form an intermediate image of an object.

11. An imaging apparatus comprising:
the image forming optical system according to claim 8; and
an image sensor configured to receive light from the image forming optical system.

12. The imaging apparatus according to claim 11, wherein the image sensor is shared by the plurality of lens units.

13. An accessory apparatus capable of being attached to and detached from an imaging apparatus, the accessory apparatus comprising:
the image forming optical system according to claim 8.

14. An accessory apparatus comprising:
the optical system according to claim 1; and
wherein the accessory apparatus is detachably mountable to an optical apparatus including the plurality of image forming units.

15. The accessory apparatus according to claim 14, wherein each of the plurality of image forming units includes a lens unit configured to form the image of the object via the optical system, and a filter disposed on an optical axis of the lens unit.

16. The accessory apparatus according to claim 14, wherein the optical apparatus is detachably mountable to an imaging apparatus.

17. The accessory apparatus according to claim 14, wherein the accessory apparatus is detachably mountable to a lens apparatus disposed closer to the object than the accessory apparatus.

18. The accessory apparatus according to claim 17, wherein the lens apparatus is detachably mountable to an imaging apparatus.

* * * * *